US012718631B2

(12) United States Patent
Reiter et al.

(10) Patent No.: US 12,718,631 B2
(45) Date of Patent: Aug. 25, 2026

(54) METHOD FOR PROVIDING DATA IN A VEHICLE

(71) Applicant: Robert Bosch GmbH, Stuttgart (DE)

(72) Inventors: Antonia Reiter, Stuttgart (DE); Krisztian Nyilas, Dunaharaszti (HU); Klaus Grabmaier, Gerlingen (DE); Wolfgang Hauck, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 77 days.

(21) Appl. No.: 18/843,122

(22) PCT Filed: Feb. 23, 2023

(86) PCT No.: PCT/EP2023/054521
§ 371 (c)(1),
(2) Date: Aug. 30, 2024

(87) PCT Pub. No.: WO2023/165887
PCT Pub. Date: Sep. 7, 2023

(65) Prior Publication Data

US 2025/0174053 A1 May 29, 2025

(30) Foreign Application Priority Data

Mar. 1, 2022 (DE) ..................... 10 2022 202 071.5

(51) Int. Cl.
*G07C 5/00* (2006.01)
*G07C 5/08* (2006.01)

(52) U.S. Cl.
CPC ........... *G07C 5/008* (2013.01); *G07C 5/0808* (2013.01)

(58) Field of Classification Search
CPC ... G07C 5/008; G07C 5/0808; H04L 67/5651; H04L 67/12; H04W 4/18; H04W 4/38; H04W 4/44
See application file for complete search history.

(56) References Cited

U.S. PATENT DOCUMENTS

2021/0306437 A1 9/2021 Hayes et al.
2023/0146926 A1* 5/2023 Gorantla ............ G01C 21/3804 701/450

FOREIGN PATENT DOCUMENTS

DE 19915097 A1 10/2000
DE 102004015163 A1 8/2005

(Continued)

OTHER PUBLICATIONS

Machine Translation DE102016009195A1 (Year: 2016).*

(Continued)

*Primary Examiner* — Michael V Kerrigan
(74) *Attorney, Agent, or Firm* — NORTON ROSE FULBRIGHT US LLP

(57) ABSTRACT

A method for providing data in a vehicle. The method includes: obtaining vehicle data, produced in the vehicle, as input data for a data filter; applying the data filter, with a provided configuration, to the input data, wherein data fulfilling one or more conditions specified by the provided configuration are selected and/or generated from the input data, wherein the one or more conditions specified by the provided configuration are present in a form that is abstracted in comparison to the vehicle data and comprises data identifiers; and providing the selected and/or generated data, if present, as output data.

9 Claims, 2 Drawing Sheets

(56) References Cited

FOREIGN PATENT DOCUMENTS

| | | | |
|---|---|---|---|
| DE | 102016009195 | B3 | 12/2017 |
| DE | 102019119460 | A1 | 1/2021 |
| DE | 102020113193 | A1 | 11/2021 |

OTHER PUBLICATIONS

Machine Translation DE19915097A1 (Year: 2001).*

Donze, Alexandre: "On Signal Temporal Logic," (Lecture) California, USA (2014), pp. 1-113.

Schumann et al. "Runtime Analysis with R2U2: A Tool Exhibition Report," Springer International Publishing AG (2016); pp. 504-509.

International Search Report for PCT/EP2023/054521, Issued Apr. 21, 2023.

* cited by examiner

METHOD FOR PROVIDING DATA IN A VEHICLE

FIELD

The present invention relates to a method for providing data in a vehicle by using a data filter and to a computing unit and a computer program for carrying out the method.

BACKGROUND INFORMATION

During the development of vehicles, both before and after the start of vehicle production, data produced in the vehicles, e.g., sensor signals, can be captured and analyzed in order to check various functions and find possible errors, for example. For example, one way to obtain such data is to use a specifically configured measurement computer in the vehicle to record the desired data.

SUMMARY

According to the present invention, a method for providing data as well as a computing unit and a computer program for carrying out said method are provided. Advantageous embodiments of the present invention are disclosed herein.

The present invention relates to the provision and in particular collection of data, in particular signals, in a vehicle or which are produced in a vehicle, in particular during operation of the vehicle. In order to obtain such data, it is possible, as mentioned, to use a specifically configured measurement computer in the vehicle to record the desired data. However, this involves a great deal of effort and is generally not practical, in particular in the case of a large number of vehicles. It has also been shown that vehicles that are, for example, already in series production and are driven by customers can sometimes provide relevant data for development (so-called field data). The use of a measurement computer is not possible here.

In addition, a large amount of such data is produced, especially in modern vehicles, since there are more and more sensors, actuators and control units or functions in the vehicle, for example for automated driving. It can become difficult to find the particular desired data. Apart from that, it would generally not be sensible to implement the collection of all vehicle data from a large number of vehicles, in particular if, for example, wireless transmission of the vehicle data to, for example, a server for further use is to be considered.

Against this background, the use or application of a specific data filter in the vehicle is provided. This data filter can, for example, be designed as a software module on a computing unit, in particular a control unit or central computer (in this case, for example, within the framework of so-called vehicle edge computing) of a vehicle. In light of the above explanations, it is particularly useful if such a data filter is used on a large number of vehicles.

In this case, vehicle data produced in the vehicle are obtained, in particular during operation of the vehicle, as input data for the data filter. For this purpose, the data filter or the relevant software module can be permitted to access, for example, one or more buses or other communication media in the vehicle in order, for example, to be able to capture or read all vehicle data produced in the vehicle. These vehicle data produced in the vehicle comprise, for example, the signals and/or messages generated by sensors and/or actuators and/or control units during operation of the vehicle. It should be noted that, depending on the type and use of the data filter, not all vehicle data produced necessarily have to be able to be captured or read, although this is useful. For example, depending on the use case, the vehicle data produced on a specific bus or by particular sensors/actuators or control units may be sufficient.

By applying the data filter, with a provided configuration, to the input data, data fulfilling one or more conditions specified by means of the provided configuration are then selected and/or generated from the input data. The selected and/or generated data (possibly in the form of signals) are then provided as output data, if present. Advantageously, the output data provided are output externally, i.e., to outside of the vehicle, in particular by means of wireless communication. For example, the output data may be transmitted to a server, from where they can be retrieved and used by a developer or other authorized person.

According to an example embodiment of the present invention, when the data filter is activated, the produced vehicle data are analyzed and, where applicable, corresponding output data are determined and provided and, where applicable, transmitted externally. In this sense, reference can also be made to a trigger or trigger framework since output data are determined or generated and, where applicable, transmitted whenever the vehicle data or input data fulfill the conditions specified by the configuration.

As explained in more detail below, when a particular configuration or a particular data filter is applied, no data may be selected and/or generated from the input data, namely if the input data do not fulfill the conditions, for example, or at least not during normal operation, but only in the event of an error, for example. However, this is precisely what is also, in particular, to be used within the scope of the present invention.

In addition, according to an example embodiment of the present invention, the one or more conditions specified by means of the provided configuration are present in a form that is abstracted in comparison to the vehicle data and comprises data identifiers. For example, a formal description language may be chosen. In this case, an assignment of such abstract designations (the data identifiers) to the (actual) vehicle signals or vehicle data must in particular be provided, for example in the form of an assignment table. An abstract description of the input data and output data in the configuration allows it to be independent of the particular vehicle architecture, E/E architecture, and vehicle function. This abstract description of data filters can be realized via a formal language, which can be used in the same way across different vehicle types, manufacturers, etc. and can therefore also be reused.

The assignment (or conversion) between abstract designations (the data identifiers) and the (actual) vehicle signals or vehicle data particularly preferably takes place automatically, in or during the application, by means of a configuration file (mapping) between the signal and the elements of the formal language used.

Upstream of the data filter, a component can be provided, which automatically translates the notation of a formal language into bytecode (e.g., in the manner of an STL compiler, STL see below), i.e., the description of the conditions (trigger condition) is always in the formal language and no code is generated manually.

This translation into bytecode may, for example, take place outside the vehicle (the upstream component is in this case located outside the vehicle) and only the translated bytecode is transmitted to the vehicle; however, it is also possible to interpret the trigger condition at runtime, in which case the upstream component is located in the vehicle.

The latter preferably takes place, for example, in the development phase and in so-called rapid prototyping, whereas the former preferably takes place in the environment of regulated operating conditions (where, for example, the effect of this change in the runtime behavior should or must be tested and safeguarded in advance).

According to an example embodiment of the present invention, particularly preferably, the data filter is applied, in particular is checked as to whether the one or more conditions specified by means of the provided configuration are fulfilled, by using a temporal logic of signals. This temporal logic of signals is also known as signal temporal logic (STL). Temporal logics or time logics are extensions of the logic through which temporal sequences can be captured. They are, for example, applications of modal logic that are based on a before/after relationship between time points.

In this case, a temporal logic of signals (STL) deals in particular with the temporal sequences of signals, in the present case the signals (or, in general, data or messages) in the vehicle. In particular, real-time limitations or real-time conditions are taken into account, as they occur or may occur during operation of the vehicle; limitations or conditions of the actually possible values may also be taken into account, for example in a manner specifically adapted to the signals or data possible in the vehicle. Further details and explanations on the temporal logic of signals can be found, for example, in people.eecs.berkeley.edu/~sseshia/fmee/lectures/EECS294-98_Spring2014_STL_Lecture.pdf.

The use of temporal logic of signals makes it possible to specify or define certain conditions (such as patterns or criteria) for signals or data, not only for individual signals but also, in particular, for combinations of a plurality of signals, which conditions must or must not be fulfilled, for example. For example, it may be true for two particular signals in the vehicle that they can never assume the same value at the same time during normal operation or without errors. If this is nevertheless the case, it can be assumed that there is an error. This makes it possible, for example, to create a configuration with conditions for a data filter, where, if there is no error, no output data that could be provided are obtained. On the other hand, if output data are obtained when the relevant data filter with this configuration is applied, it can be concluded that there is an error, for example in one of the two signals or in the units (sensor, actuator, control unit) generating these signals. Similarly, the use of temporal logic of signals also allows certain signals or combinations of signals (or data) that are, for example, important for a particular development project or a particular problem, to be filtered out of the input data and then to be provided as output data.

By using a formal language, it is possible to ensure mathematically provable system properties (e.g., minimum distance), or even to derive statistical arguments, if, for example, no data on specified misbehavior can be collected over a large vehicle/kilometer/operating-hour sample.

An example of conditions in the formal language using STL is given below:

float vx, ax;

bool PersonDetection;

formula=once [0s, 2s, ax<=0] and once [2s, 2.1s, PersonDetection] and always [2s, 2.1s, vx>2];

This sets conditions for the velocity (vx) and acceleration (ax) of the vehicle in the x or longitudinal direction and for the detection of a person by means of a camera (PersonDetection). If a person is detected while the vehicle is driving faster than 2 ms/ and the acceleration is less than or equal to 0 $m/s^2$ within the next 2 seconds, data are to be captured and output. In this case, braking is assumed to have occurred due to person detection. The terms "once" and "always" correspond to common STL conditions.

The component mentioned above (STL compiler) can, for example, translate these conditions into bytecode so that the relevant control unit knows which signals to monitor in order to know, for example, the velocity of the vehicle. Accordingly, an obtained signal (which is, for example, present as bytecode) can be translated back into the formal description.

Not only can one such data filter with one configuration be provided, but a plurality of such data filters can also be provided in a vehicle or a computing unit of a vehicle (or also in different computing units of the vehicle). They may be used for different purposes but basically function in the same way. Different data filters may, but do not have to, access the same vehicle data. The output data of different filters are generally different, but may also be the same, even if, for example, the types of data filters or their configurations are different.

According to an example embodiment of the present invention, preferably, the data filter is activated or deactivated on the basis of information obtained externally, i.e., from outside the vehicle, in particular by means of wireless communication (i.e., over the air (OTA)), for activating or deactivating the data filter. The data filter can thus basically be present on a computing unit of the vehicle, for example as the mentioned software module in, for example, a specifically provided memory area, and be activated only as needed and be deactivated again thereafter if necessary. For example, a development team may be interested in certain signals or their properties at a certain time. For this purpose, the data filter stored on the computing unit can be activated with the corresponding configuration for a particular period of time.

Advantageously, according to an example embodiment of the present invention, the configuration is selected on the basis of information obtained externally, i.e., from outside the vehicle, in particular by means of wireless communication, for selecting the configuration from a plurality of configurations. A plurality of, in particular different, configurations, which, for example, determine different output data from the input data, can thus be stored for the data filter. In this case, one of the configurations can be selected depending on the current requirements; this may, for example, take place by transmitting a corresponding command (information for selecting the configuration) to the vehicle or the executing computing unit.

If the data filter with the (selected) configuration is activated, the vehicle data produced are analyzed at runtime, in particular during vehicle operation, at runtime, and, where applicable, corresponding output data are determined and provided and, where applicable, transmitted externally. In this sense, reference can also be made to a trigger or trigger framework since output data are determined or generated and, where applicable, transmitted whenever the vehicle data or input data fulfill the conditions specified by the configuration.

According to an example embodiment of the present invention, it is also advantageous if the configuration is obtained externally, i.e., from outside the vehicle, in particular by means of wireless communication. Although the configuration may, for example, already be provided in the executing computing unit during the production of the vehicle (e.g., as part of or in a similar manner to a so-called variant coding of vehicles), it may also be transmitted to the computing unit later. This is of interest, for example, if a certain configuration only becomes relevant or known later. A plurality of configurations can also be obtained in this way; additional configurations can also be added to existing configurations in this way. One or more existing configurations can also be updated in this way.

Preferably, according to an example embodiment of the present invention, applying the data filter comprises using a machine learning algorithm, such as an artificial neural network. By means of the machine learning algorithm, certain calculations or criteria can, for example, be applied, according to the configuration, to the input data for the data filter in order to obtain the output data. However, a machine learning algorithm can, for example, also be used only for subtasks thereof, e.g., for the preselection of input data ultimately to be checked and/or for the preprocessing of input data for the application of temporal logic for signals. It is therefore also possible to integrate complex calculation steps, regardless of the particular use case.

A neural network (NN) can, for example, be integrated into the preprocessing chain of the signals by feeding the output signal of the neural network, again as input (input data), into the data filter. For example, a neural network could represent the function of "sensor blindness" and, in this case, the data filter outputs data if sensor blindness of the front camera is continuously detected over a specified time period (e.g., 300 ms). A use case for this could be that windshield wiper movements are, for example, to be eliminated as false positives.

In principle, this usually allows any type of complex calculations to be outsourced from the data filter and only the temporal dependence at the output signal level of the complex calculations to be modeled. The complex detection logic is thus separated from the temporal behavior and from interdependencies.

Advantageously, according to an example embodiment of the present invention, providing the vehicle data, comprising at least applying the data filter but in particular also acquiring the input data and providing the output data, takes place only if one or more criteria regarding a runtime behavior are fulfilled. In particular, providing the vehicle data is also discontinued if the one or at least one of the plurality of criteria is no longer fulfilled. As already mentioned, applying the data filter, including provision, and, where applicable, transmitting the output data takes place at runtime. Computing resources in the executing computing unit are thus used for this purpose. Care should therefore be taken to ensure that the tasks for which the computing unit (e.g., control unit, central computer) is actually or primarily provided can still be performed. If this is no longer possible, or no longer possible within a specified time, due to the application of the data filter, applying the data filter can and should be interrupted or, if necessary, not started at all. Possible criteria include, for example, a certain proportion of freely available computing power and/or memory space or the absence of safety-critical control interventions.

According to an example embodiment of the present invention, applying such a data filter in the field of safety-critical systems can also be made possible by pre-reserving the required protected memory area on the executing computing unit, wherein it should be ensured that changes in the scope and configuration of the data filters are exclusively within the limits of the pre-reserved protected memory area and runtime budget.

A computing unit according to the present invention, e.g., a control unit or a central computer of a motor vehicle, is configured, in particular in terms of program, to carry out a method according to the present invention.

Furthermore, the implementation of a method according to the present invention in the form of a computer program or computer program product having program code for carrying out all the method steps is advantageous because it is particularly low-cost, in particular if an executing control unit is also used for further tasks and is therefore present anyway. Finally, a machine-readable storage medium is provided with a computer program as described above stored thereon. Suitable storage media or data carriers for providing the computer program are, in particular, magnetic, optical, and electric storage media, such as hard disks, flash memory, EEPROMs, DVDs, and others. It is also possible to download a program via computer networks (Internet, intranet, etc.). Such a download can be wired or wireless (e.g., via a WLAN network or a 3G, 4G, 5G or 6G connection, etc.).

Further advantages and embodiments of the present invention can be found in the description and the figures.

The present invention is shown schematically in the figures on the basis of exemplary embodiments and is described below with reference to the figure.

DETAILED DESCRIPTION OF EXAMPLE EMBODIMENTS

Figure 1:
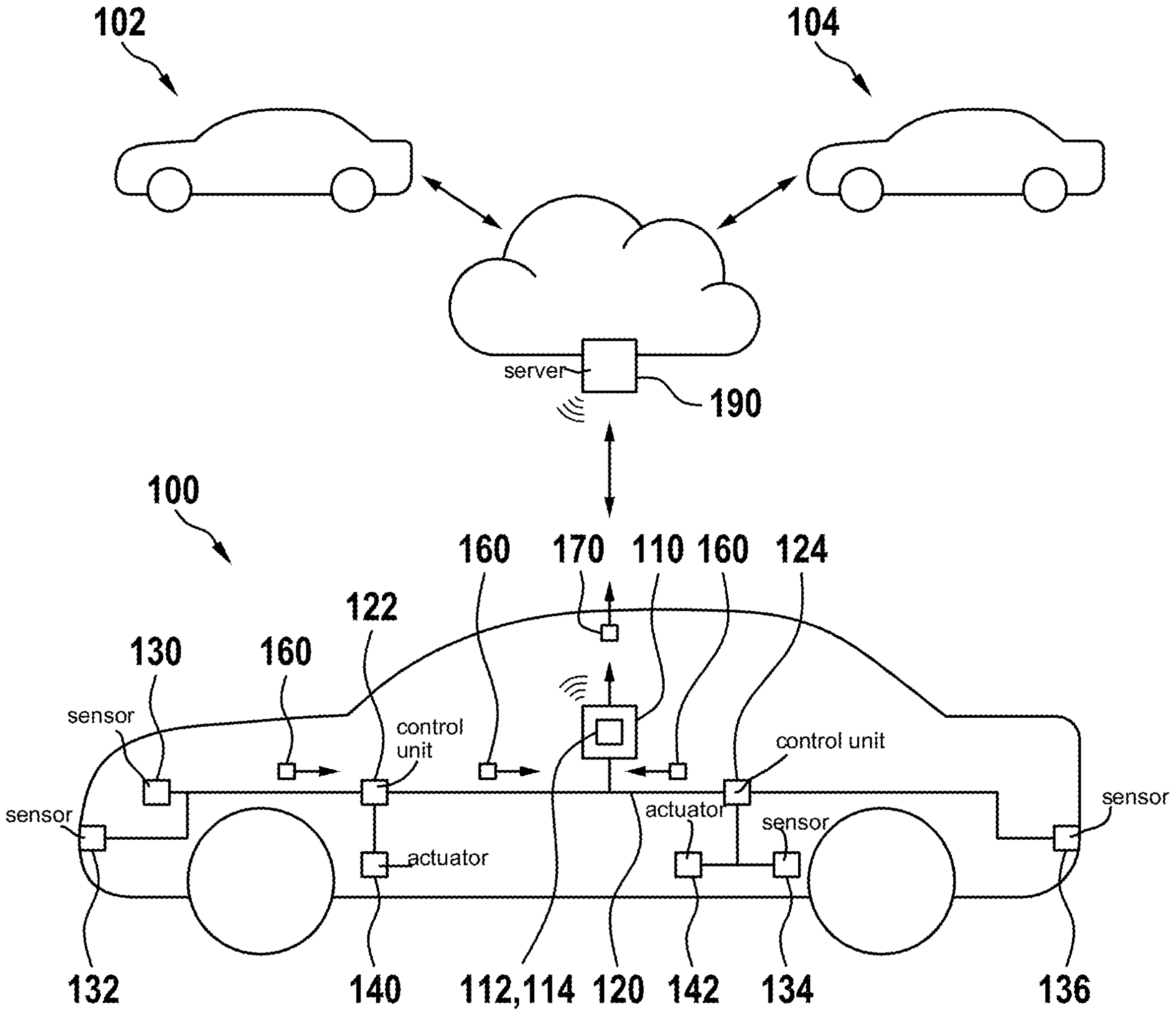
FIG. 1 schematically shows a vehicle for explaining a preferred example embodiment of the present invention.

FIG. 1 schematically shows a vehicle 100 for explaining a preferred embodiment of the present invention. The vehicle 100 comprises, for example, a computing unit 110 designed as a central computer 110, to which two control units 122 and 124 are connected, by way of example, via a communication connection or a bus 120.

Sensors 130, 132, 134 and 136 as well as actuators 140, 142 are connected to the control units 122, 124. The sensors may, for example, be cameras, radar sensors, ultrasonic sensors, lidar sensors, tachometers or other transducers or measuring devices as well as, for example, inertial sensors. The actuators may, for example, be brake actuators, steering actuators or other control elements. During operation of the vehicle 100, the sensors, actuators and control units generate signals or data or, in general, vehicle data, which are denoted by 160 by way of example. These data or signals are applied to the communication connection 120 and can be read or captured by the central computer 110.

A data filter 112 with a configuration 114 is executed in or on the central computer 110. The vehicle data 160 serve as input data for the data filter 112. By means of the data filter 112, certain portions of the vehicle data are selected from the input data according to the configuration 114 and transmitted as output data 170, for example wirelessly, to a server 190 or another computing unit outside the vehicle, i.e., externally. There, a developer can, for example, access the output data 170 in order to use them for analysis.

Furthermore, by way of example, two further vehicles 102, 104 are indicated, on the central computer of which a data filter with a corresponding configuration may also be present. This is to illustrate that such a data filter can be present and applied in a large number of vehicles, for example in the field, in order to be able to collect certain vehicle data from this large number of vehicles.

Figure 2:
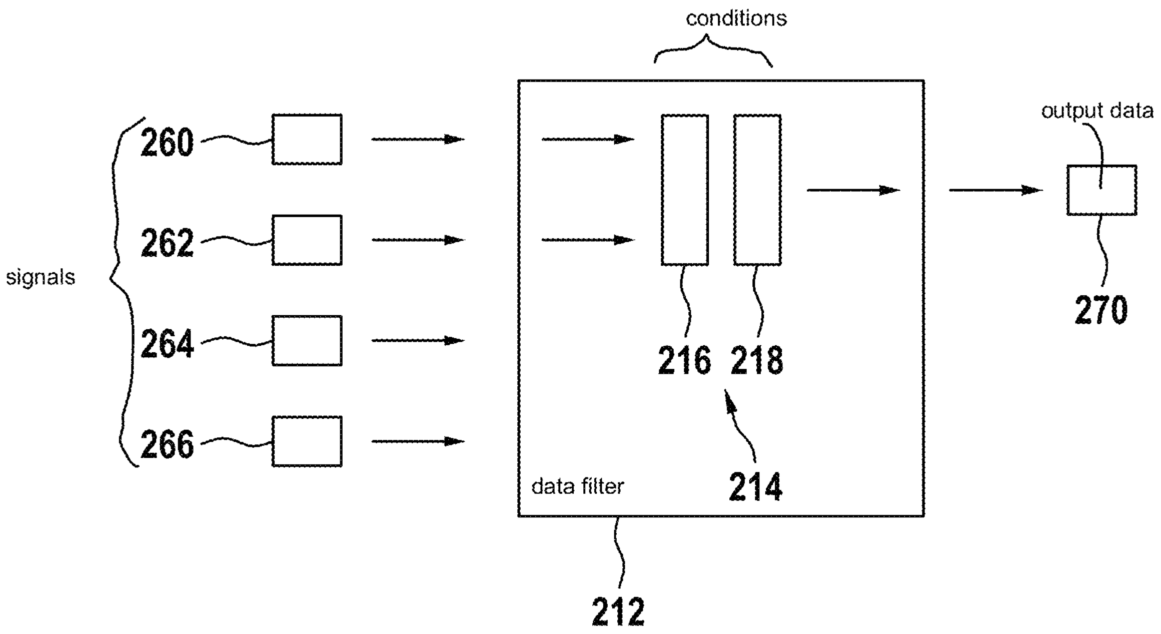
FIG. 2 schematically shows a sequence of a method according to the present invention in a preferred example embodiment.

FIG. 2 schematically shows a sequence of a method according to the present invention in a preferred embodiment. A data filter 212 is shown, which can correspond, for example, to the data filter 112 in FIG. 1.

During operation of the vehicle, vehicle data, i.e., various signals, are captured and supplied as input data to the data filter 212. Four signals 260, 262, 264, 266 are shown by way of example. The data filter 212 has a configuration 214, which is specified by two conditions 216, 218, by way of example. The condition 216 may, for example, include that only signals of type 260 and 262 are considered. The condition 218 may in this case include that, of the signals considered, one signal, for example the one of type 260, must assume a value of one before the signal of type 262. These conditions can be formulated in such a way that they are never fulfilled during normal operation, because, for example, the signal 260 never assumes the value one before signal 262, but does so at most after it.

Accordingly, only if an error is present, both conditions 216 and 218 are fulfilled and data 270, e.g., information that an error has occurred, are provided as output data.

In another configuration, it is, for example, possible to specify only the condition that only signals of type 264 are considered, which are always output (possibly directly) as output data in this case.

In this way, desired data filters can be used very quickly and flexibly in a large number of vehicles in order to obtain the desired vehicle data.

It is important here that the configuration 214 also specifies which data should be provided or stored when a condition (trigger condition) 216, 218 is fulfilled. These data can also be signals (vehicle data) other than those used for the trigger conditions, i.e., here 260, 262. A preferred use case is that, for example, triggering takes place on the basis of simple scalar signals, but that the camera image should additionally be stored afterward. As described at the beginning, not only can data be selected from the vehicle data, but other data can also be generated if necessary.

The invention claimed is:

1. A method for providing data in a vehicle, comprising:

obtaining, by a computing unit of the vehicle during operation of the vehicle, vehicle data, including signals generated by sensors and/or actuators and/or control units of the vehicle, as input data for a data filter;

applying, by the computing unit, the data filter to the input data using a provided configuration, wherein:

the provided configuration specifies one or more conditions using a formal description language comprising data identifiers that are abstracted from the vehicle data;

an assignment between the data identifiers and the vehicle data is used to automatically map the data identifiers to corresponding signals of the vehicle data;

the one or more conditions are evaluated using a temporal logic of signals that defines temporal relationships between the signals, including real-time constraints on values and/or sequences of the signals;

the applying of the data filter includes:

evaluating the one or more conditions at runtime on the computing unit based on temporal sequences of the signals; and selecting and/or generating data from the input data only when the one or more conditions are fulfilled;

providing, by the computing unit, the selected and/or generated data, when present, as output data for transmission to a computing unit external to the vehicle; and controlling, by the computing unit, application of the data filter based on one or more runtime behavior criteria of the computing unit, including at least one of available computing power, memory availability, or absence of safety-critical control intervention, such that the applying of the data filter is performed only when the one or more runtime behavior criteria are fulfilled and is discontinued when the one or more runtime behavior criteria are no longer fulfilled.

2. The method according to claim 1, wherein the provided output data are output externally, by wireless communication.

3. The method according to claim 1, wherein the data filter is activated or deactivated based at least partially on information obtained from an external source, via wireless communication.

4. The method according to claim 1, wherein the provided configuration is selected from a plurality of predefined configurations based on information obtained from an external source, via wireless communication.

5. The method according to claim 1, wherein the provided configuration is obtained from or updated by an external source via wireless communication.

6. The method according to claim 1, wherein a plurality of data filters, each with a respective configuration, is used for determining and providing respective output data.

7. The method according to claim 1, wherein the applying of the data filter includes using a machine learning algorithm.

8. A computing unit including a control unit or central computer of a vehicle, the computing unit being configured to:

obtain, during operation of the vehicle, vehicle data including signals generated by sensors and/or actuators and/or control units of the vehicle, as input data for a data filter;

apply the data filter to the input data using a provided configuration, wherein:

the provided configuration specifies one or more conditions using a formal description language comprising data identifiers that are abstracted from the vehicle data;

an assignment between the data identifiers and the vehicle data is used to automatically map the data identifiers to corresponding signals of the vehicle data;

the one or more conditions are evaluated using a temporal logic of signals that defines temporal relationships between the signals, including real-time constraints on values and/or sequences of the signals;

the application of the data filter includes:

evaluating the one or more conditions at runtime on the computing unit based on temporal sequences of the signals; and selecting and/or generating data from the input data only when the one or more conditions are fulfilled;

provide the selected and/or generated data, when present, as output data for transmission to a computing unit external to the vehicle; and control application of the data filter based on one or more runtime behavior criteria of the computing unit, including at least one of available computing power, memory availability, or absence of safety-critical control intervention, such that the applying of the data filter is performed only when the one or more runtime behavior criteria are fulfilled and is discontinued when the one or more runtime behavior criteria are no longer fulfilled.

9. A non-transitory machine-readable storage medium on which is stored a computer program providing data in a vehicle, the computer program, when executed by a computer of the vehicle, causing the computer to perform the following steps:

obtaining, during operation of the vehicle, vehicle data including signals generated by sensors and/or actuators and/or control units of the vehicle, as input data for a data filter;

applying the data filter to the input data using a provided configuration, wherein:

the provided configuration specifies one or more conditions using a formal description language comprising data identifiers that are abstracted from the vehicle data;

an assignment between the data identifiers and the vehicle data is used to automatically map the data identifiers to corresponding signals of the vehicle data;

the one or more conditions are evaluated using a temporal logic of signals that defines temporal relationships between the signals, including real-time constraints on values and/or sequences of the signals;

the applying of the data filter includes:

evaluating the one or more conditions at runtime on the computing unit based on temporal sequences of the signals; and selecting and/or generating data from the input data only when the one or more conditions are fulfilled;

providing the selected and/or generated data, when present, as output data for transmission to a computing unit external to the vehicle; and controlling application of the data filter based on one or more runtime behavior criteria of the computing unit, including at least one of available computing power, memory availability, or absence of safety-critical control intervention, such that the applying of the data filter is performed only when the one or more runtime behavior criteria are fulfilled and is discontinued when the one or more runtime behavior criteria are no longer fulfilled.

* * * * *